United States Patent
Chen et al.

(10) Patent No.: US 8,373,680 B2
(45) Date of Patent: Feb. 12, 2013

(54) OPTICAL TOUCH PANEL AND COORDINATE INFORMATION CORRECTION METHOD AND DETECTING DEVICE THEREFOR

(75) Inventors: Jau-Yu Chen, Taipei Hsien (TW); Yu-Wen Ting, Taipei Hsien (TW)

(73) Assignee: Lite-On Semiconductor Corp., Taipei Hsien (TW)

( * ) Notice: Subject to any disclaimer, the term of this patent is extended or adjusted under 35 U.S.C. 154(b) by 231 days.

(21) Appl. No.: 12/975,702

(22) Filed: Dec. 22, 2010

(65) Prior Publication Data

US 2012/0038591 A1     Feb. 16, 2012

(30) Foreign Application Priority Data

Aug. 12, 2010   (TW) ................................. 99126915 A

(51) Int. Cl.
*G06F 3/042* (2006.01)
(52) U.S. Cl. ...................... 345/175; 345/173; 178/18.09
(58) Field of Classification Search .......... 345/173–176; 178/18.01–18.09
See application file for complete search history.

(56) References Cited

U.S. PATENT DOCUMENTS

| 5,317,140 | A  | * | 5/1994 | Dunthorn ...................... 250/221 |
| 6,570,103 | B1 | * | 5/2003 | Saka et al. .................. 178/18.01 |
| 6,674,424 | B1 | * | 1/2004 | Fujioka .......................... 345/157 |
| 6,919,880 | B2 | * | 7/2005 | Morrison et al. ............. 345/173 |
| 2001/0019325 | A1 | * | 9/2001 | Takekawa ..................... 345/157 |

* cited by examiner

*Primary Examiner* — Amare Mengistu
*Assistant Examiner* — Premal Patel
(74) *Attorney, Agent, or Firm* — Rosenberg, Klein & Lee

(57) ABSTRACT

A coordinate information correction method for an optical touch panel includes: a) determining a set of to-be-corrected included angle values according to output signals received from light detectors, each of the to-be-corrected included angle values representing an included angle between a base line and a connecting line that extends from a respective one of the light detectors to a location of an object in a light curtain region; b) calculating a set of correction values, each of which is a finite order function of a respective one of the to-be-corrected included angle values; c) calculating a set of corrected included angle values from the set of to-be-corrected included angle values and the set of correction values; and d) generating corrected coordinate information associated with the location of the object in the light curtain region from the corrected included angle values.

15 Claims, 3 Drawing Sheets

OPTICAL TOUCH PANEL AND COORDINATE INFORMATION CORRECTION METHOD AND DETECTING DEVICE THEREFOR

CROSS-REFERENCE TO RELATED APPLICATION

This application claims priority of Taiwanese Application No. 099126915, filed on Aug. 12, 2010.

BACKGROUND OF THE INVENTION

1. Field of the Invention

The present invention relates to a correction method for a touch panel, more particularly to a coordinate information correction method for an optical touch panel.

2. Description of the Related Art

Conventional touch panels include resistive touch panels, capacitive touch panels, and optical touch panels. The resistive touch panel, compared to the capacitive touch panel, is less expensive but has a slower response.

One example of an optical touch panel uses an infrared LED module, which emits infrared beams, and photodetector pairs around a periphery of the touch panel for detecting an interruption in a pattern of the infrared beams. Another optical touch panel uses an infrared backlight module and at least two image sensors (CCD or CMOS sensor elements) placed around the periphery of the touch panel for detecting a shadow, which is produced by an object approaching the touch panel, in a light curtain region defined by the infrared backlight module so as to locate the object.

A conventional optical touch panel disclosed in U.S. Patent Application Publication No. 2009/0146972 teaches the use of a processor to determine distortion parameters of lenses during calibration for correcting pointer coordinate data associated with a position of the pointer relative to a touch surface. Since the techniques proposed therein adopt nonlinear equations, the solutions obtained are only approximations, and the calculations involved are relatively complicated.

SUMMARY OF THE INVENTION

Therefore, an object of the present invention is to provide a coordinate information correction method which is applied to an optical touch panel, and which permits correction of different kinds of distortion of the optical touch panel by calculating relatively simple equations.

Accordingly, a coordinate information correction method of this invention is for an optical touch panel that includes a touch surface, a light source module, at least two light detectors, and a processor. The light source module is disposed to define a light curtain region on one side of the touch surface. The at least two light detectors are disposed at at least one edge of a periphery of the touch surface, and are spaced apart from each other. Each of the light detectors has a field of detection along the touch surface. The light detectors are arranged in a manner that at least portions of the fields of detection of the light detectors overlap with each other and that the light detectors are able to detect changes in intensity of the light received from the light source module that are produced as a result of the presence of an object in the light curtain region. The processor receives output signals from the at least light detectors.

The coordinate information correction method comprises:
a) determining, using the processor, a set of to-be-corrected included angle values according to the output signals, each of the to-be-corrected including angle values representing an included angle between a base line and a connecting line that extends from a respective one of the light detectors to a location of the object in the light curtain region;
b) calculating, using the processor, a set correction values, each of which is a finite order function of a respective one of the to-be-corrected included angle values;
c) calculating, using the processor, a set of corrected included angle values from the set of to-be-corrected included angle values and the set of correction values; and
d) generating, using the processor, corrected coordinate information associated with the location of the object in the light curtain region from the corrected included angle values.

Preferably, in step b), the processor is configured calculate the set of correction values ($\Delta\alpha_1, \Delta\alpha_2, \ldots \Delta\alpha_k$) according to the following equation $$\Delta\alpha_j = A_{jo} + \sum_{i=1}^{n} A_{ji}(\alpha_{j\_act})^i, \; j = 1 \sim k, n \geq 1,$$

in which k represents a total number of the light detectors in the optical touch panel, j represents a jth one of the light detectors, i is a power of the equation, $A_{jo} \sim A_{ji}$ are predetermined correction coefficients, and $\alpha_{j\_net}$ is the to-be-corrected included angle value corresponding to the jth one of the light detectors.

Preferably, in step c), the processor is configured to calculate a jth one of the corrected included angle values ($\alpha_{1\_cor}, \alpha_{2\_cor}, \ldots \alpha_{k\_cor}$) as a difference between the jth one of the to-be-corrected included angle values and the jth one of the correction values.

Preferably, for each of the light detectors, the connecting line is a line passing through a lens of the light detector and the location of the object in the light curtain region, and the base line passes through the lens of the light detector.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
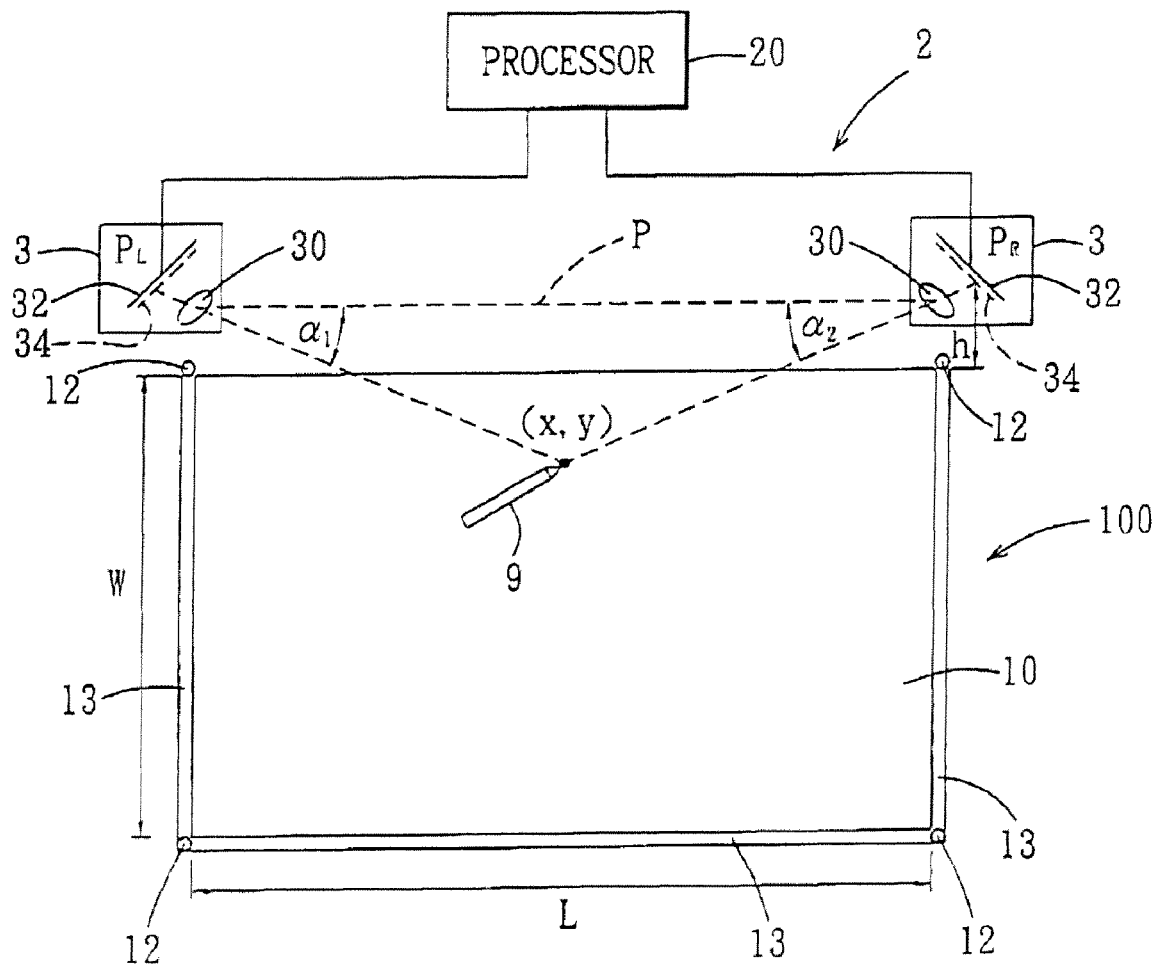
FIG. 1 is a schematic diagram illustrating a preferred embodiment of an optical touch panel of the present invention.

Referring to FIG. 1, a preferred embodiment of an optical touch panel 100 according to the present invention includes a touch surface 10, which is generally a planar surface, for contact with an object 9, a light source module, and a detecting device 2. The light source module is disposed to define a light curtain region on one side of the touch surface 10, and includes a plurality of light sources 12 for emitting invisible light, for example infrared LEDs, and a plurality light guides 13 for uniformly distributing the light emitted from the light sources 12 across the side of the touch surface 10. The touch surface 10 is substantially rectangular in shape and has a length L and a width W.

The detecting device 2 includes two light detectors 3, and a processor 20. The light detectors 3 are disposed respectively adjacent to a first corner and a second corner, wherein the first corner and the second corner are located at two ends of a long edge of the touch surface 10. Each of light detectors 3 includes a sensor 32, a lens 30, and an optical filter 34. The optical filters 34 have a light filtering capability such that only light of a specific wavelength is able to pass therethrough and reach the sensors 32 for subsequent detection thereby, thus obtaining more accurate detection results.

Figure 3:
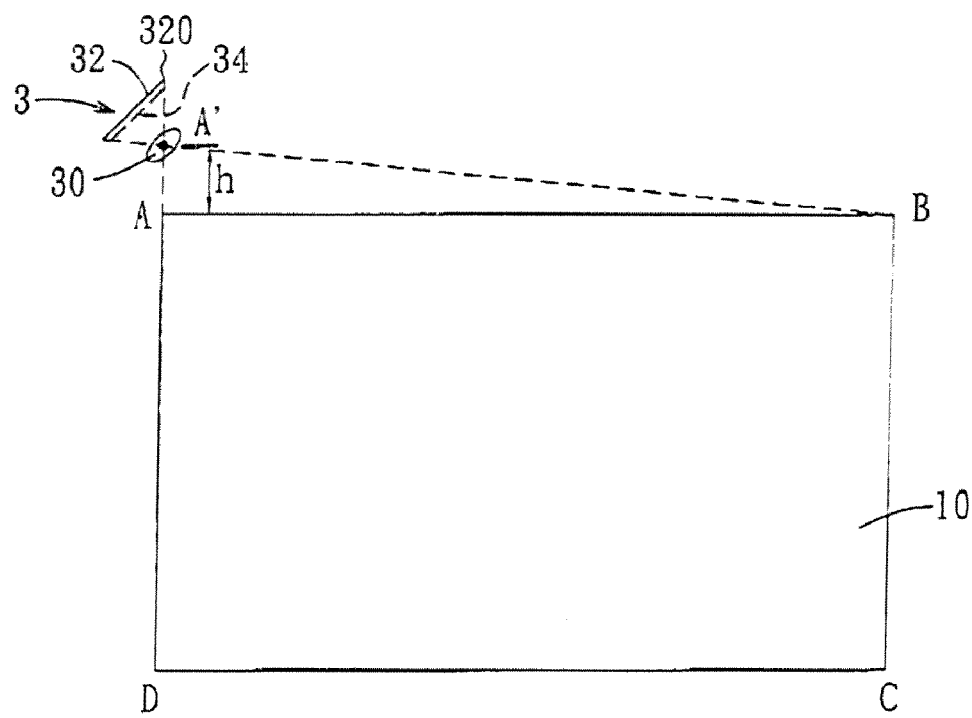
FIG. 3 is a schematic diagram, illustrating a field of detection of one light detector of a detecting device of the preferred embodiment.
Figure 4:
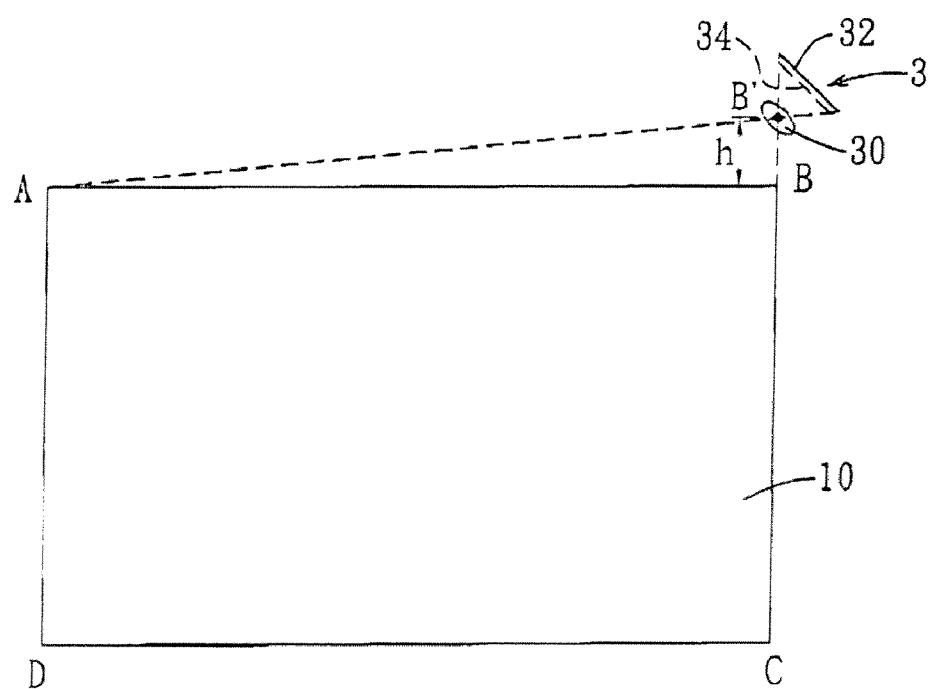
FIG. 4 is a schematic diagram, illustrating a field of detection of another light detector of the detecting device of the preferred embodiment.

Referring to FIG. 3 and FIG. 4, each of the light detectors 3 has a field of detection along the touch surface 10. The light detectors 3 are arranged in a manner that at least portions of the fields of detection of the light detectors 3 overlap with each other and that the light detectors 3 are able to detect changes in intensity of the light received from the light source module. Specifically, each of the light detectors 3 is disposed at a distance h from said long edge of the touch surface 10. The touch surface 10 has a monitoring field ACD. Referring to FIG. 3, the light detector 3 near the first corner, which is at a point A, has the field of detection A'BCD that is able to cover the monitoring field ABCD. Furthermore, referring to FIG. 4, the light detector 3 near the second corner, which is at a point B, has the field of detection AB'CD that is able to cover the monitoring field ABCD.

Referring to FIG. 1, each of the sensors 32 may be a linear sensor or an array sensor, and has sensing elements (not shown) for generating output signals, from which information about included angle values may be obtained. In particular, the output signals represent the changes in intensity of the light received from the light source module that are produced as a result of the presence of the object 9 in the light curtain region, and each of the included angle values represents an included angle between a base line (P) and a connecting line that extends from a respective one of the light detectors 3 to a location of the object 9 in the light curtain region.

Moreover, each connecting line is a line passing through the lens 30 of the respective light detector 3 and the location of the object 9 in the light curtain region, and the base line (P) passes through the lenses 30 of the two light detectors 3 in this embodiment.

Furthermore, each sensing element of the sensors 32 is associated with a corresponding detection angle for detecting the changes in light intensity along an extension line at the corresponding detection angle. For example, referring once again to FIG. 3, the changes in intensity of the light along a connecting line from A to D may be detected by a corresponding sensing element, which has the corresponding detection angle at 90 degrees, located at an edge 320 of the sensor 32 near the first corner.

Figure 2:
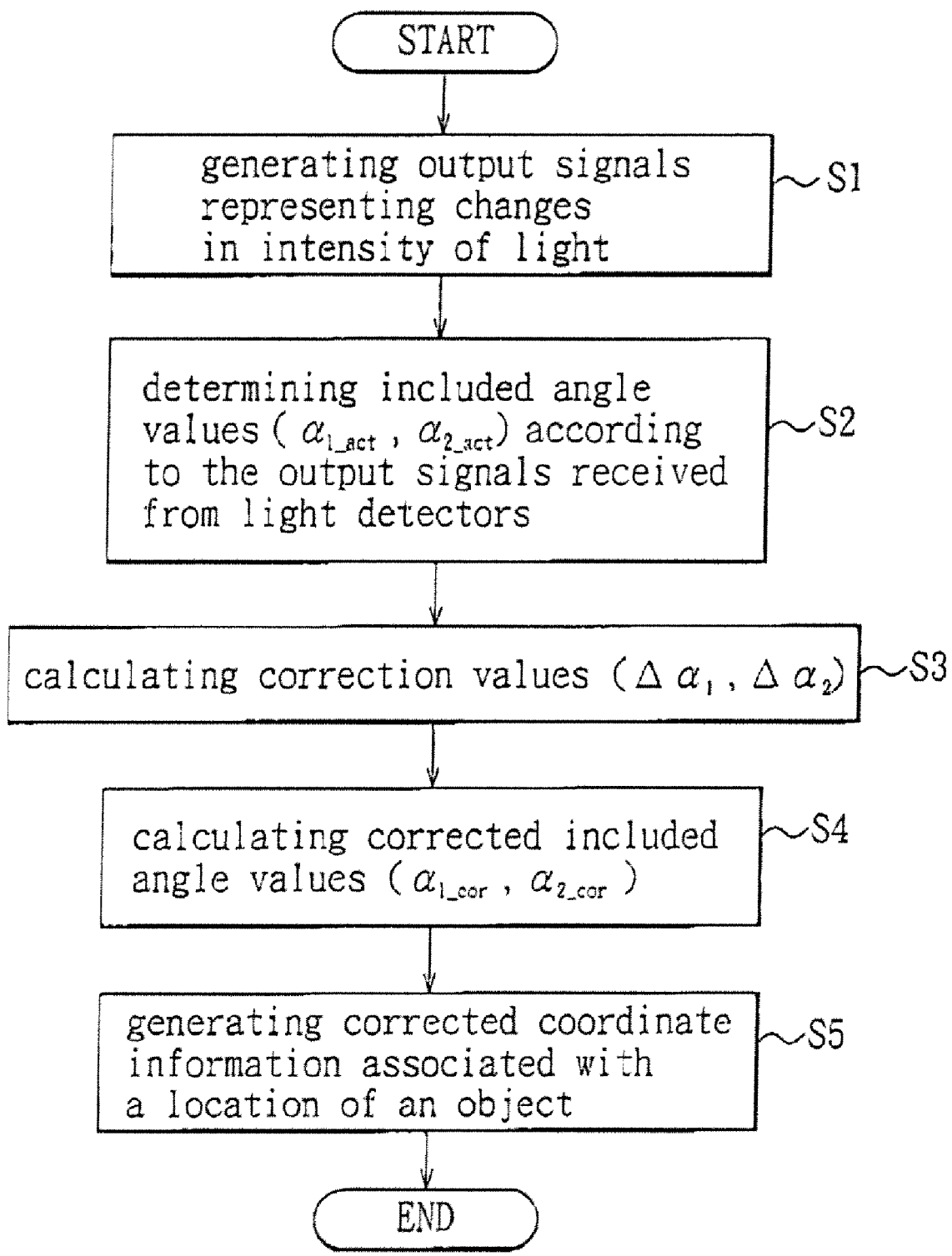
FIG. 2 is a flowchart illustrating a coordinate information correction method for the optical touch panel of FIG. 1.

Referring to FIG. 1 and FIG. 2, the processor 20 is connected to the two light detectors 3. A coordinate information correction method is performed by the detecting device 2 and comprises the steps of:

S1) generating, using the light detectors 3, the output signals indicative of the changes in intensity of the light received from the light source module;

S2) determining, using the processor 20, a set of to-be-corrected included angle values according to the output signals received from the light detectors 3, i.e., an angle value $\alpha_{1\_act}$ represents the included angle between the base line (P) that passes through the light detector 3 near the first corner and the connecting line that extends from said light detector 3 to the location of the object 9; similarly, another angle value $\alpha_{2\_act}$ represents the included angle between the base line (P) and the connecting line that extends from the light detectors 3 near the second corner to the location of the object 9 may be detected. The angle value ($\alpha_{1\_act}$, $\alpha_{2\_act}$) are defined as the to-be-corrected angle values;

S3) calculating, using the processor 20, a set of correction values ($\Delta\alpha_1$, $\Delta\alpha_2$), each of which is a finite order function of a respective one of the to-be-corrected included angle values ($\alpha_{1\_act}$, $\alpha_{2\_act}$), according to the following equation $$\Delta\alpha_j = A_{jo} + \sum_{i=1}^{n} A_{ji}(\alpha_{j\_act})^i, j = 1 \sim k, n \geq 1,$$

in which k represents a total number of the light detectors 3 in the optical touch panel 100, j represents a jth one of the light detectors 3, i is a power of the equation, $A_{jo} \sim A_{ji}$ are correction coefficients, and $\alpha_{j\_act}$ is the to-be-corrected included angle value corresponding to the jth one of the light detectors 3. In this embodiment, n=5, and $\Delta\alpha_j$ is thus a fifth order function of $\alpha_{j\_act}$. The correction coefficients $A_{jo} \sim A_{ji}$, are predetermined using regression algorithms according to sampling points with known coordinates. For example, the L×W touch surface 10 is divided into a 5×5 grid having 36 grid points (inclusive of boundary points), and each of the grid points has a set of known included angle values ($\alpha_{1\_ref}$, $\alpha_{2\_ref}$). During a calibration process, the detecting device 2 detects the presence of an object, such as a touch pen, at each of the grid points in the light curtain region, and generates a respective one of a set of calibration included angle values ($\alpha_{1\_cal}$, $\alpha_{2\_cal}$) which may be represented by the following two equations $$\alpha_{1\_cal} = A_{10} + A_{11}\alpha_{1\_ref} + A_{12}\alpha_{1\_ref}^2 + A_{13}\alpha_{1\_ref}^3 + A_{14}\alpha_{1\_ref}^4 + A_{15}\alpha_{1\_ref}^5,$$

$$\alpha_{2\_cal} = A_{20} + A_{21}\alpha_{2\_ref} + A_{22}\alpha_{2\_ref}^2 + A_{23}\alpha_{2\_ref}^3 + A_{24}\alpha_{2\_ref}^4 + A_{25}\alpha_{2\_ref}^5,$$

Regression algorithms are used to find $A_{10} \sim A_{15}$ and $A_{20} \sim A_{25}$ that would make a summation of $|\alpha_{1\_cal} - \alpha_{1\_ref}|$ obtained for each of the grid points and a summation of $|\alpha_{2\_cal} - \alpha_{2\_ref}|$ obtained for each of the grid points reach minimum values. The $A_{10} \sim A_{15}$ and $A_{20} \sim A_{25}$ thus found are the correction coefficients in the step S3);

S4) calculating, using the processor 20, a set of corrected included angle values ($\alpha_{1\_cor}$, $\alpha_{2\_cor}$) from the set of to-be-corrected included angle values ($\alpha_{1\_act}$, $\alpha_{2\_act}$) and the set of correction values ($\Delta\alpha_1$, $\Delta\alpha_2$ according to the following equations $$\alpha_{1\_cor} = \alpha_{1\_act} - \Delta\alpha_1,$$

$$\alpha_{2\_cor} = \alpha_{2\_act} - \Delta\alpha_2; \text{ and}$$

S5) generating, using the processor 20, corrected coordinate information associated with the location of the object 9 in the light curtain region from the corrected included angle values ($\alpha_{1\_cor}$, $\alpha_{2\_cor}$) by using triangulation computations.

In this way, when the optical touch panel 100 has input from the object 9, the optical touch panel 100 may detect, calculate and generate corrected coordinate information associated with the location of the object 9, such that the response of the optical touch panel 100 corresponds correctly to the input.

Moreover, numbers and placement positions of the light detectors 3 are not limited to the closure this embodiment, as long as the light detectors 3 are not less than two in number, and any adjacent two of which are disposed at a periphery of the touch surface 10 and are spaced apart from each other. The processor 20 may process the output signals received from any of the light detectors 3 using the same coordinate information correction method.

In summary, the optical touch panel 100 of the present invention may correct deviation angles first, and then generate coordinate information from the corrected angle values. The technique utilized by the present invention may replace a conventional correction method, which requires complicated calculations to obtain rectangular coordinates. Furthermore, deviation errors may be corrected regardless of what components the deviation errors attributed to.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A coordinate information correction method for an optical touch panel, the optical touch panel including
   a touch surface,
   a light source module disposed to define a light curtain region on one side of the touch surface,
   at least two light detectors which are disposed at at least one edge of a periphery of the touch surface and which are spaced apart from each other, each of the light detectors having a field of detection along the touch surface, the light detectors being arranged in a manner that at least portions of the fields of detection of the light detectors overlap with each other and that the light detectors are able to detect changes in intensity of the light received from the light source module that are produced as a result of the presence of an object in the light curtain region, and
   a processor receiving output signals from the at least two light detectors,
   said coordinate information correction method comprising:
   a) determining, using the processor, a set of to-be-corrected included angle values according to the output signals, each of the to-be-corrected included angle values representing an included angle between a base line and a connecting line that extends from a respective one of the light detectors to a location of the object in the light curtain region;
   b) calculating, using the processor, a set of correction values, each of which is a finite order function of a respective one of the to-be-corrected included angle values;
   c) calculating, using the processor, a set of corrected included angle values from the set of to-be-corrected included angle values and the set of correction values; and
   d) generating, using the processor, corrected coordinate information associated with the location of the object in the light curtain region from the corrected included angle values.

2. The coordinate information correction method as claimed in claim 1, wherein, in step b), the processor is configured to calculate the set of correction values ($\Delta\alpha_1$, $\Delta\alpha_2$, ... $\Delta\alpha_k$) according to the following equation $$\Delta\alpha_j = A_{jo} + \sum_{i=1}^{n} A_{ji}(\alpha_{j\_act})^i, \ j = 1 \sim k, n \geq 1,$$

in which k represents a total number of the light detectors in the optical touch panel, j represents a jth one of the light detectors, i is a power of the equation, $A_{jo} \sim A_{ji}$, are predetermined correction coefficients, and $\alpha_{j\_act}$ is the to-be-corrected included angle value corresponding to the jth one of the light detectors.

3. The coordinate information correction method as claimed in claim 2, wherein, in step c), the processor is configured to calculate a jth one of the corrected included angle values ($\alpha_{1\_cor}$, $\alpha_{2\_cor}$, ... $\alpha_{k\_cor}$) as a difference between the jth one of the to-be-corrected included angle values and the jth one of the correction values.

4. The coordinate information correction method as claimed in claim 3, wherein, for each of the light detectors, the connecting line is a line passing through a lens of the light detector and the location of the object in the light curtain region, and the base line passes through the lens of the light detector.

5. A detecting device for use with an optical touch panel, the optical touch panel including a touch surface and a light source module disposed to define a light curtain region on one side of the touch surface, said detecting device comprising:
   at least two light detectors to be disposed at at least one edge of a periphery of the touch surface in a spaced apart manner such that a field of detection of each of said light detectors is along the touch surface, wherein said light detectors are to be arranged in manner that at least portions of the fields of detection of said light detectors overlap with each other and that said light detectors are able to detect changes in intensity of the light received the light source module that are produced as a result of the presence of an object in the light curtain region; and
   a processor receiving output signals from said at least two light detectors, said processor being configured to
   determine, according to the output signals, a set of to-be-corrected included angle values, each representing an included angle between a base line and a connecting line that extends from a respective one of said light detectors to a location of the object in the light curtain region,
   calculate a set of correction values, each of which is a finite order function of a respective one of the to-be-corrected included angle values,
   calculate a set of corrected included angle values from the set of to-be-corrected included angle values and the set of correction values, and
   generate corrected coordinate information associated with the location of the object in the light curtain region from the corrected included angle values.

6. The detecting device as claimed in claim 5, wherein said processor is configured to calculate the set of correction values ($\Delta\alpha_1$, $\Delta\alpha_2$, ... $\Delta\alpha_k$) according to the following equation $$\Delta\alpha_j = A_{jo} + \sum_{i=1}^{n} A_{ji}(\alpha_{j\_act})^i, \ j = 1 \sim k, n \geq 1,$$

in which k represents a total number of said light detectors, j represents a jth one of said light detectors, i is a power of the equation, $A_{jo} \sim A_{ji}$, are predetermined correction coefficients, and $\alpha_{j\_act}$ is the to-be-corrected included angle value corresponding to the jth one of said light detectors.

7. The detecting device as claimed in claim 6, wherein said processor is configured to calculate a jth one of the corrected included angle values ($\alpha_{1\_cor}, \alpha_{2\_cor}, \ldots \alpha_{k\_cor}$) as a difference between the jth one of the to-be-corrected included angle values and the jth one of the correction values.

8. The detecting device as claimed in claim 7, wherein, for each of said light detectors, the connecting line is a line passing through a lens of said light detector and the location of the object in the light curtain region, and the base line passes through said lens of said light detector.

9. The detecting device as claimed in claim 5, wherein each of said light detectors has a light filtering capability such that only light of a specific wavelength is able to pass therethrough for subsequent detection thereby.

10. An optical touch panel comprising:
a touch surface;
a light source module disposed to define a light curtain region on one side of said touch surface;
at least two light detectors which are disposed at at least one edge of a periphery of said touch surface and which are spaced apart from each other, each of said light detectors having a field of detection along said touch surface, said light detectors being arranged in a manner that at least portions of the fields of detection of said light detectors overlap with each other and that said light detectors are able to detect changes in intensity of the light received from said light source module that are produced as a result of the presence of an object in said light curtain region; and
a processor receiving output signals from said at least two light detectors, said processor being configured to
determine, according to the output signals, a set of to-be-corrected included angle values, each representing an included angle between a base line and a connecting line that extends from a respective one of said light detectors to a location of the object in said light curtain region,
calculate a set of correction values, each of which is a finite order function of a respective one of the to-be-corrected included angle values,
calculate a set of corrected included angle values from the set of to-be-corrected included angle values and the set of correction values, and
generate corrected coordinate information associated with the location of the object in said light curtain region from the corrected included angle values.

11. The optical touch panel as claimed in claim 10, wherein said processor is configured to calculate the set of correction values ($\Delta\alpha_1, \Delta\alpha_2, \ldots \Delta\alpha_k$) according to the following equation $$\Delta\alpha_j = A_{jo} + \sum_{i=1}^{n} A_{ji}(\alpha_{j\_act})^i, j = 1 \sim k, n \geq 1,$$

in which k represents a total number of said light detectors in said optical touch panel, j represents a jth one of said light detectors, i is a power of the equation, $A_{jo} \sim A_{ji}$ are predetermined correction coefficients, and $\alpha_{j\_act}$ is the to-be-corrected included angle value corresponding the jth one of said light detectors.

12. The optical touch panel as claimed in claim 11, wherein said processor is configured to calculate a jth one of the corrected included angle values ($\alpha_{1\_cor}, \alpha_{2\_cor}, \ldots \alpha_{k\_cor}$) as a difference between the jth one of the to-be-corrected included angle values and the jth one of the correction values.

13. The optical touch panel as claimed in claim 12, wherein, for each of said light detectors, the connecting line is a line passing through a lens of said light detector and the location of the object in said light curtain region, and the base line passes through said lens of said light detector.

14. The optical touch panel as claimed in claim 10, wherein each of said light detectors has a light filtering capability such that only light of a specific wavelength is able to pass therethrough for subsequent detection thereby.

15. The optical touch panel as claimed in claim 10, wherein said light source module includes at least one light source for emitting invisible light, and a light guide for uniformly distributing the light emitted from said at least one light source across said one side of said touch surface.

* * * * *